US006050769A

United States Patent [19]

Papalia et al.

[11] Patent Number: 6,050,769

[45] **Date of Patent: *Apr. 18, 2000**

[54] MOBILE SKIP BIN HANDLING VEHICLES IMPROVEMENTS

[76] Inventors: Giovanni Papalia, 1867 Main North Road, Salisbury Heights, SA 5109; James Caruso, 2 Redvers Road, Salisbury Park, SA 5109, both of Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/860,033

[22] PCT Filed: Apr. 3, 1996

[86] PCT No.: PCT/AU96/06201

§ 371 Date: Jun. 9, 1997

§ 102(e) Date: Jun. 9, 1997

[87] PCT Pub. No.: WO96/31417

PCT Pub. Date: Oct. 10, 1996

[30] Foreign Application Priority Data

Apr. 3, 1995 [AU] Australia ............................... PN 2099

[51] Int. Cl.[7] ........................................................ B60P 1/02

[52] U.S. Cl. .......................... 414/408; 414/491; 414/498; 414/788.2; 414/789.7

[58] Field of Search .................................... 414/406, 407, 414/408, 409, 789.7, 788.2, 498, 491, 546

[56] References Cited

U.S. PATENT DOCUMENTS

| | | | |
|---|---|---|---|
| 2,954,885 | 10/1960 | Sexton | 414/406 |
| 3,666,126 | 5/1972 | Rempel | 414/408 |
| 4,057,157 | 11/1977 | Park et al. . | |
| 4,113,120 | 9/1978 | Pickrell | 414/406 |
| 4,310,279 | 1/1982 | Johnston | 414/408 |
| 4,548,542 | 10/1985 | Reese . | |
| 4,715,767 | 12/1987 | Edelhoff et al. . | |
| 4,934,896 | 6/1990 | Quinto . | |
| 4,941,796 | 7/1990 | DeFilippi . | |
| 5,059,081 | 10/1991 | Brown et al. | 414/408 |
| 5,064,332 | 11/1991 | Edelhoff et al. . | |
| 5,114,304 | 5/1992 | Edelhoff et al. . | |
| 5,401,137 | 3/1995 | Nijenhuis | 414/495 |
| 5,474,413 | 12/1995 | Georg . | |
| 5,501,567 | 3/1996 | Lanzdorf et al. | 414/408 |
| 5,651,654 | 7/1997 | Christenson | 414/408 |
| 5,769,594 | 6/1998 | Kalua | 414/543 |

FOREIGN PATENT DOCUMENTS

| | | | |
|---|---|---|---|
| 2 407 156 | 5/1979 | France . | |
| 562810 | 5/1930 | Germany | 414/406 |
| 1238841 | 4/1967 | Germany | 414/406 |
| 315343 | 12/1988 | Japan | 414/408 |
| 7-157004 | 6/1995 | Japan . | |
| 412085 | 1/1974 | U.S.S.R. | 414/408 |
| 863474 | 9/1981 | U.S.S.R. | 414/406 |

*Primary Examiner*—Thomas J. Brahan
*Attorney, Agent, or Firm*—McAulay Nissen Goldberg Kiel & Hand, LLP

[57] ABSTRACT

A material handling vehicle which includes stored skip bins in nested arrangement between the cabin and a bulk tipping bin and hydraulically activateable arms adapted to lift and tip any selected skip bin from the storage position or from a ground supporting position and to have this empty at selected positions along the length of the bulk tipping bin and having a bulk tipping bin which itself is mobile and which can be tipped to effect material removal rearward of the bulk tipping bin or relocation of the bulk tipping bin fully rearward of the motor vehicle.

15 Claims, 5 Drawing Sheets

MOBILE SKIP BIN HANDLING VEHICLES IMPROVEMENTS

This invention relates to a mobile skip bin handling vehicle and in particular to a material transport motor vehicle having an arrangement to store a plurality of skip bins.

Material transport motor vehicles are well known and motor vehicles with means to engage and lift skip bins so as to empty these into a portion of the motor vehicle are also known.

Such vehicles however are intended for a single purpose and we have discovered that there can be designed a motor vehicle which can efficiently and economically handle skip bins, unload these, and as well store a plurality of these on the motor vehicle in a way that is compatible with conventional height and side clearances for transport.

Accordingly, it is an object of this invention to provide a multipurpose motor vehicle which can provide for material transport as well as for skip bin storage. At the least, the object is to provide the public with a useful alternative.

According to the invention then this can be said to reside in a mobile skip bin handling vehicle comprising a vehicle with hydraulically activated arms attached either side, a storage area capable of storing many skip bins, and a removable bulk tipping bin with the capacity to contain the contents of a number of skip bins.

In preference the invention can be said to reside in a mobile skip bin handling material transport motor vehicle characterised in that there are included hydraulic operable arm means attached to at least one side of the vehicle and adapt to engage and lift and rotate each of selected skip bins, a drivers cabin at or toward a front of the vehicle, a storage area adapted to provide space to store a number of skip bins nested one within the other in an area being located between the drivers cabin and a removable bulk bin located at or toward a rear of the vehicle.

In preference the vehicle has arm means that are attached to both sides of the vehicle.

In preference, the arm means comprise for each side of the vehicle, a first arm, a first end of which is pivotally secured to the chassis and a second end of which pivotally supports the second arm.

In preference, the second arm has a third arm pivotally secured to it, and a bracing extending between the second arm on one side of the vehicle to the second arm on the other side of the vehicle.

In preference, the removable bulk tipping bin is removable by being slidable to a position fully rearward of the chassis of the vehicle.

In preference, there are attachment means by which the bulk tipping bin is attachable to the arms and its position can be controlled thereby to effect a tipping of the bin for removal of material therefrom.

In preference, the first arm is attached to the vehicle chassis through a quadrilateral linkage with a hydraulic arm attached to a portion of the quadrilateral linkage whereby to assist mechanical advantage through its full range of action of the ram with respect to the first arm.

For a better understanding of the invention it will now be described with the assistance of drawings in which:

FIG. 1 is a perspective view of the embodiment showing the bulk tipping bin in its storage position on the vehicle, a stack of skip bins nested one within the other and located between a front of the bin and the cabin of the motor vehicle, and the respective arms holding in an elevated position above the cabin of the vehicle, skip bin;

FIG. 2 is a side elevation of the embodiment showing in this case the bulk tipping bin being located at a fully rearward position of the truck so that it is off loaded and there being shown in dotted outline firstly an intermediate position and a loaded position on the truck, and the hydraulic operable arm means as shown through three positions where the solid outline shows the arms being connected through a cable to a front lower portion of the bulk tipping bin, and the arms then being shown in two further positions whereby the bulk tipping bin is being pulled up and forward to a fully loaded position;

Figure 5:
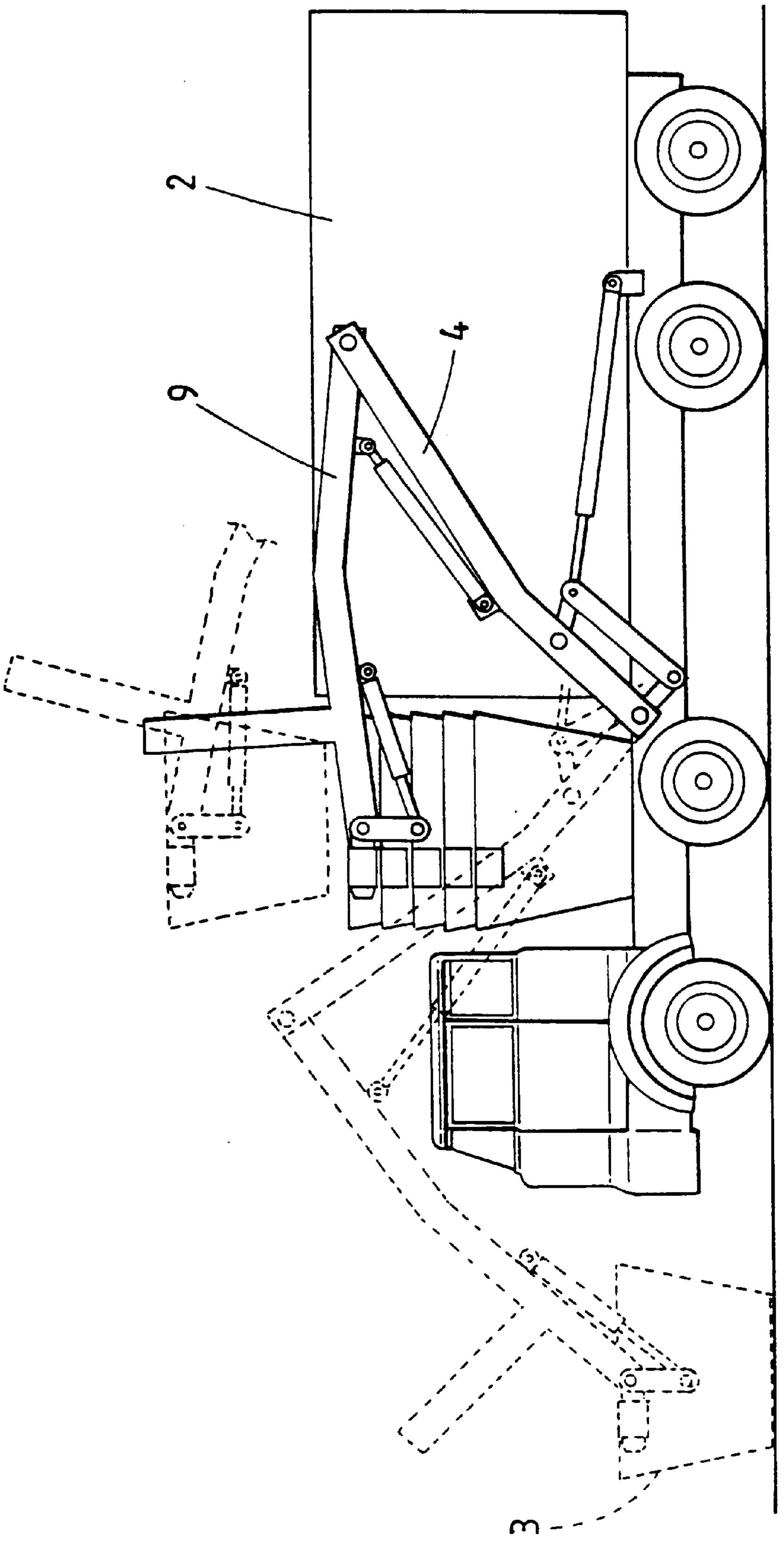
Figure 6:
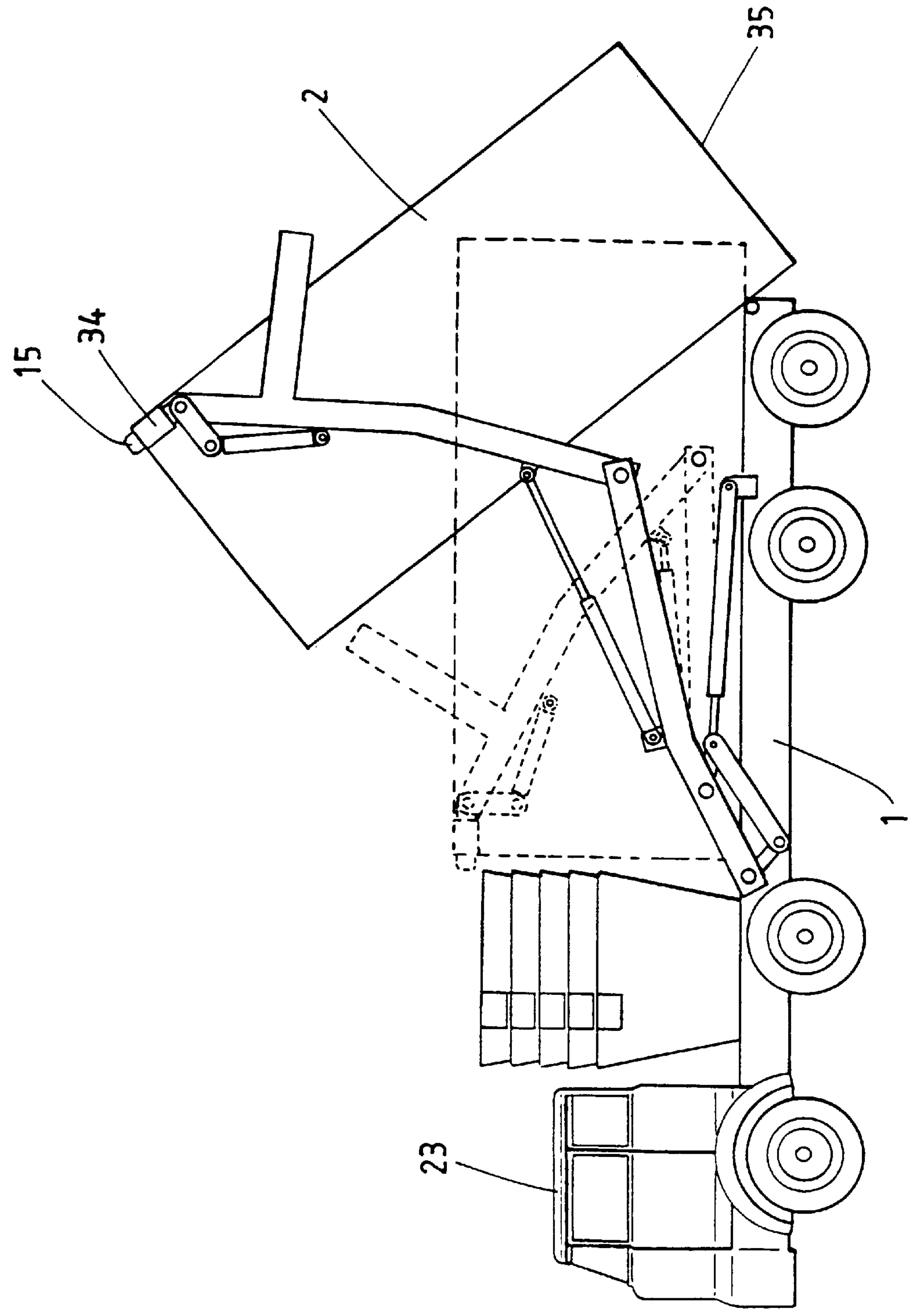

FIG. 5 is a side elevation of the embodiment showing the location of the arm means through positioning of a skip bin in the storage position with other nested skip bins, and extending forward to engage or lower a skip bin forward of the vehicle; and FIG. 6 shows the arm means being used to lift the bulk tipping bin so that material will be tipped rearward and through a rearward most opening gate in the bin.

Now describing the embodiment and referring to the drawings in detail, a material transport motor vehicle 1 supports at a rear, a removable bulk tipping bin 2. A plurality of skip bins 3 are located just forward of the bulk tipping bin 2 and on the chassis of the motor vehicle 1 the skip bins 3 being each of a wedge shape so that they will nest one within the other and therefore provide convenient compact and efficient storage. There are now provided hydraulic operable arm means which includes a first arm (a primary loading arm) 4 noting that there are in every case, a duplicate of the arrangement on each side of the motor vehicle and these are arranged to be acting in unison both by reason of being coupled together mechanically and by having a sharing arrangement through the hydraulic connections of any rams.

This first arm is pivotally secured to the motor vehicle chassis at 5 and is driven through hydraulic ram 6 which likewise is pivotally secured at 7, and a front of the hydraulic ram 6 is pivotally secured at pivot 8 to the first arm 4.

A second arm 9 is pivoted at a first end to the first arm 4 at 10 and a hydraulic ram 11 is coupled to the second arm 9 at pivot connection 12 and the other end of the hydraulic ram 11 is pivotally coupled at 13 to the first arm 4.

Extending between the second arm 9 and its matching arm on the other side of the truck 1 is a dual arm bracing 14. Extending in pivotal fashion from the second arm 9 is a fork 15 which is adapted to fit within a fork tube 16 which is appropriately located at each side of the respective skip bins 3 the fork being pivoted at 17 there being a radial arm 18 the position of which is controlled by hydraulic ram 19 which is secured at 20 by a pivotal connection to the second arm 9 and to the radial arm 18 by pivot connection at 21.

In this way, the position of the skip bin 3 when being supported by the fork 15 inside the fork tube 16 can be controlled in position in terms of its tipping location and orientation or it can be readily located in the storage area 22 located behind the cabin 23 and the bulk tipping bin 1 on the vehicle.

The quadrilateral link arrangement shown at 24 has for its purpose to assist the hydraulic ram 6 to provide sufficient lever arm force to the first arm 4 in extreme locations the arrangement includes a link arm 25, a connecting arm 26 and a link arm 27.

The pivot at 28 is a pivot connected to the chassis of the motor vehicle so that both the pivot 5 and 28 are in a fixed position relative to the motor vehicle and the link 27 therefore simply has a strengthening roll between the two.

Figure 1:
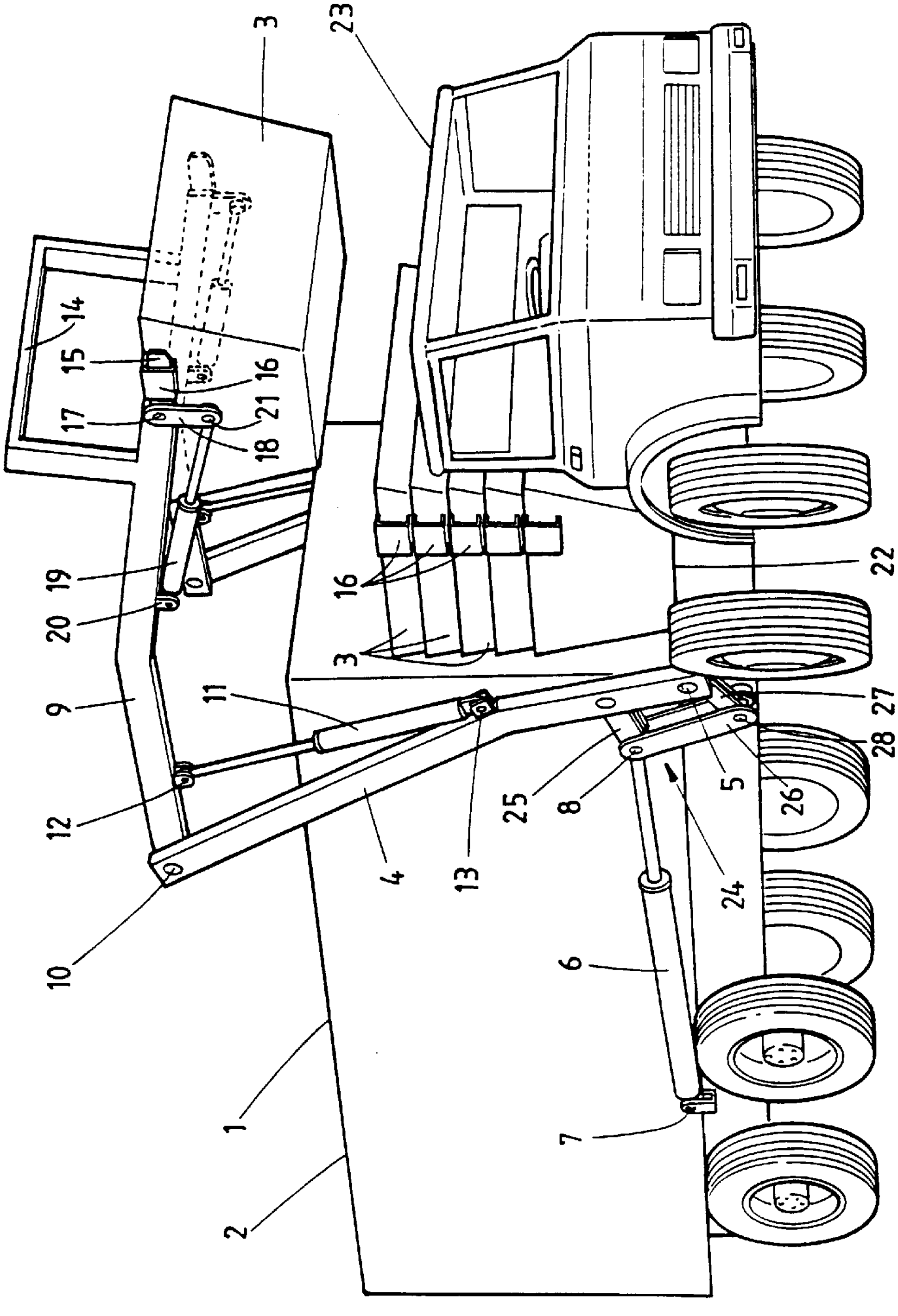
Figure 2:
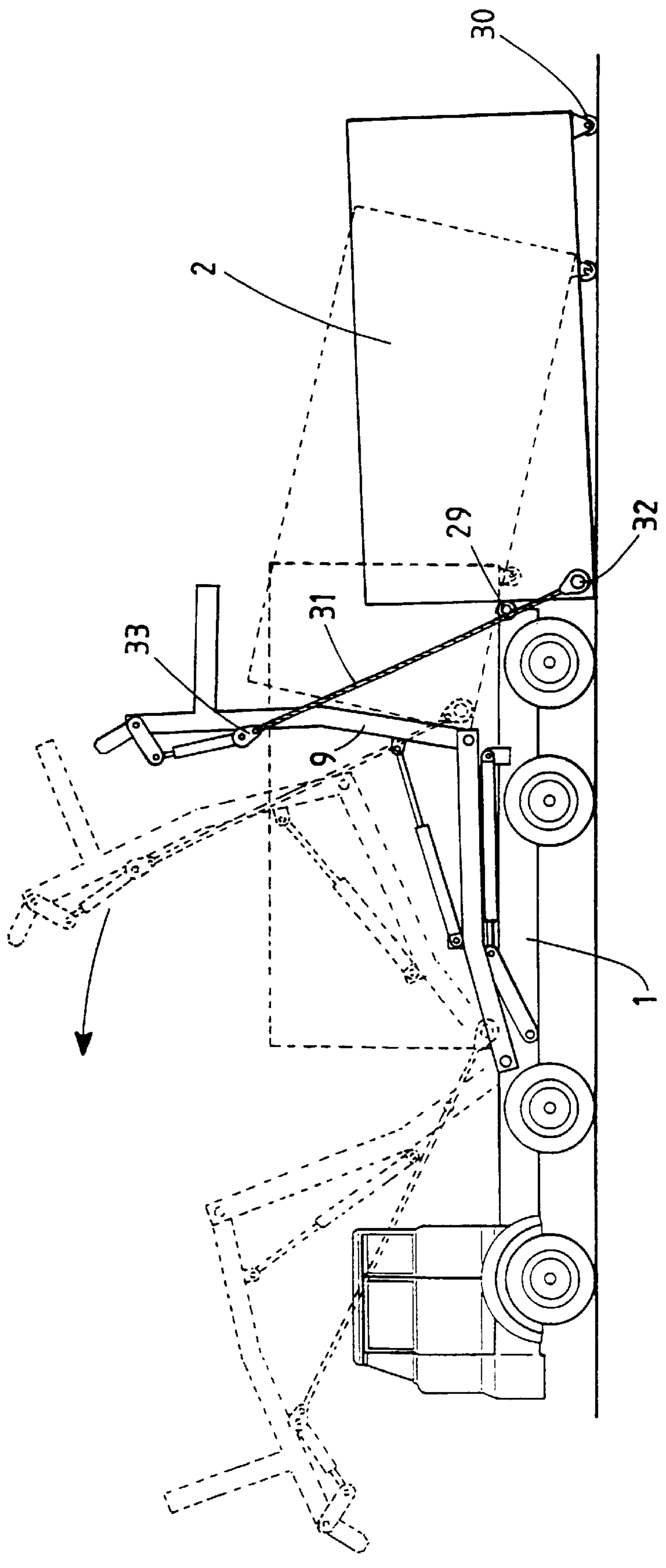
Figure 3:
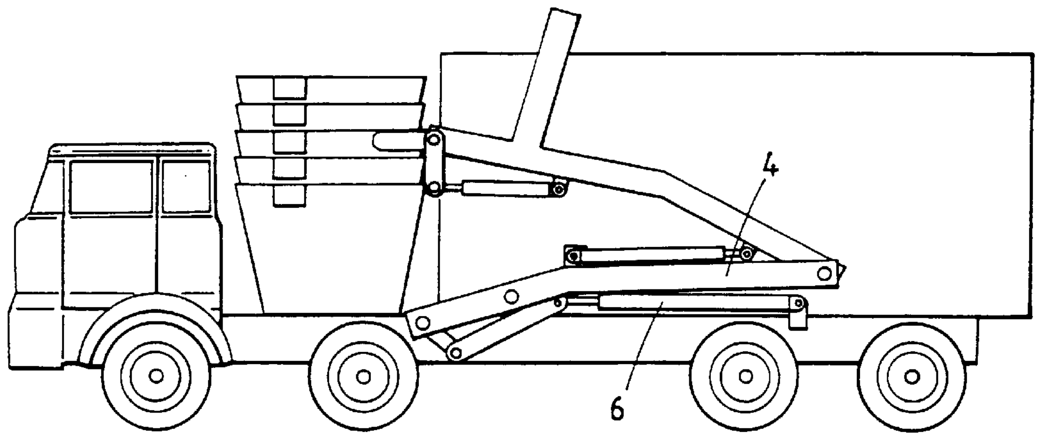
FIG. 3 is a side elevation of the embodiment in which the vehicle is partially loaded with skip bins, the bulk bin is in the storage position and the arm means are in a resting position.
Figure 4:
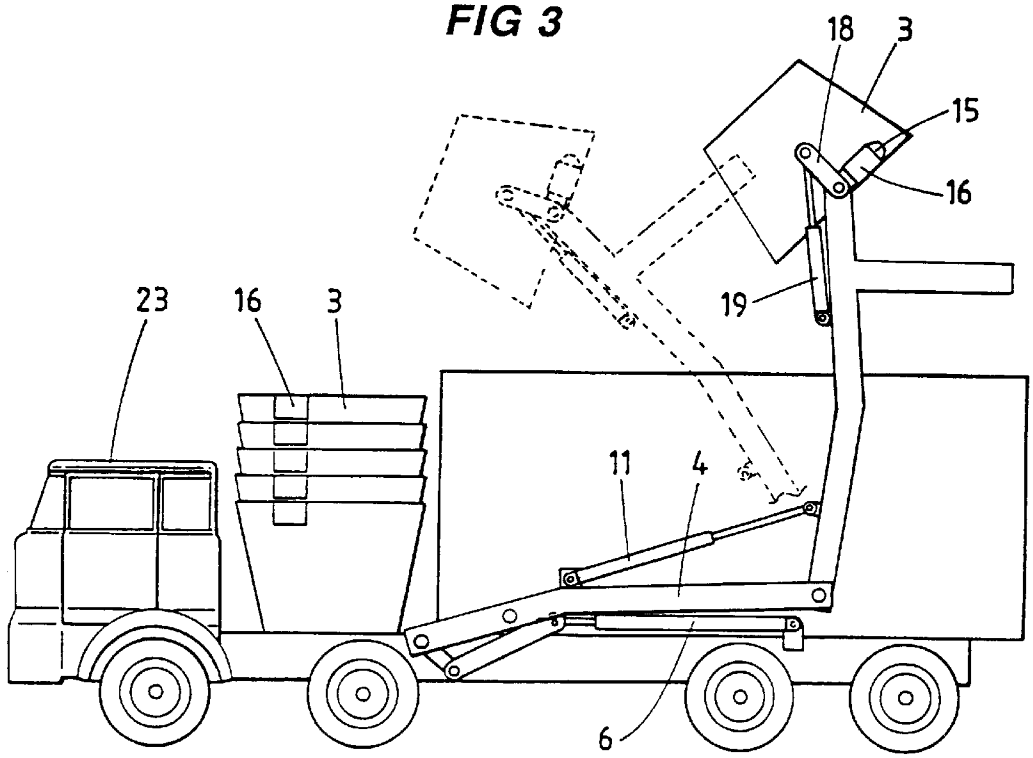
FIG. 4 illustrates the two positions of the hydraulic operable arm means where they are supporting and tipping a skip bin in two different positions along the length of the bulk tipping bin.

The positions when such a linkage is of value and means that hydraulic ram of less or general size can be used or the stress on the pivot connections will necessarily be less, as shown for instance in positions where the hydraulic ram 6 are more or less horizontal and having to press against the first arm 4 in this situation. This is shown perhaps most obviously in FIGS. 2, 3 and 4.

At the rear of the chassis of the motor vehicle 1 there is a roller 29 which provides a rolling support for the bulk tipping bin 2 when this is tipped rearwardly, and there are appropriate rearward wheels 30 at the back of the bulk tipping bin 2 to assist the bulk tipping bin 2 to be pushed rearward if the vehicle 1 is kept stationary.

To both load on and load off the bulk tipping bin 2, there is provided a cable 31 noting that this is duplicated as is the case with all of the support mechanisms on both sides of the vehicle and in this case, this cable 31 is connected at a lower end to a lower corner of the bulk tipping bin 2 at 32 and at an upper end to a convenient position on the second arm 9 at 33.

With the three sets of hydraulic rams on each side of the motor vehicle and with their appropriate location and positioning with respect to the lever arch, there can thus be provided a very versatile vehicle indeed.

For instance, as shown in FIG. 5, the arms can come fully forward and locate their forks in tubes of a skip bin 3 so that they can approach the skip bin, locate the forks in the appropriate tubes and then lift the skip bin while keeping it in an appropriate constant orientation so as not to lose material within the skip bin, transport this back across the cabin 23, the storage area 22 and then back to any forward or rearward position with respect to the bulk tipping bin 2.

When the skip bin has been emptied, this can then be relocated forward of the vehicle, or it can be located back into the nested storage area 22.

When necessary, the vehicle can be taken to a general discharge location and as is shown in FIG. 6, there can be a tube 34 into which the fork 15 is located, and the bulk tipping bin 2 can therefore be lifted fully at its front so as to tip rearward and to discharge any material through a self opening gate which is not specifically shown at 35.

From the description it will now be seen that there is provided a mobile skip bin handling material transport motor vehicle which is of very beneficial characteristics enabling the skip bins themselves to be transported and stored on the vehicle while at the same time there are means to efficiently handle these for location on the ground, emptying or storing on the vehicle itself.

Modifications and changes to the said preferred embodiment can be made and in accord with a second embodiment, the dual arm bracing 14 is removed and the respective hydraulic operable arm means are kept in synchronism on each side by a solid axel passing fully from one side to another providing the pivot support relative to the motor vehicle chassis at 5.

In a further alteration, the fork 15 engages a pin projecting from the side of the skip bin and the location is chosen so that the skip bin when being lifted through a range of positions other than when being tipped, will hang in a freely hung position and therefore be self aligning through these.

When the skip bin needs to be tipped when being located over the bin 2, then operation of the hydraulic ram 19 can still be used to push the skip bin into an orientated position but once the material has been tipped, the bin itself can be allowed to resume its naturally hung orientation.

Further, there has been found to be significant advantage in providing an inclined front on the bin 2 specifically so that when it is being lifted from a position on the ground to a position on the vehicle, the first lift by cable 31 will be such that the roller 29 engages against the inclined front surface of the bin 2 assisting in this lifting action.

The position of the inclined front part is such that the inclination starts about half way up the height of the bin and tapers inwardly toward the inner part of the bin through to the floor of the bin where it is somewhat more rearward of the previous front position.

In a further advantageous arrangement in relation to a further preferred embodiment, the quadrilateral link is duplicated for use in relation to the pivot connection at 10 in co-operation with ram 11.

In a further improvement the arm means comprise a single arm on one side only of the vehicle.

In a further improvement the skip bins are located at a rearwardmost position on the vehicle and the bulk bin is located between the cabin at a forward most location and the storage area on the vehicle. In this case the tipping of the bin would be to a side and the bin could be removed by again being moved to the side.

In a further improvement the vehicle is not a motor vehicle and is a trailable vehicle and the skip bin storage area is at a front of the trailable vehicle and the bulk bin is behind this. There fore the motor vehicle is at the front to pull the trailer and the skip bins are effectively between the cabin of the front vehicle and the bulk bin.

These and other improvements are all intended to be understood to be included within the scope of this invention.

What is claimed is:

1. A mobile skip bin handling vehicle comprising at least two skip bins, including:

two hydraulically activated arm members, one of said arm members being on each side of the vehicle, a storage area on the vehicle for storing said at least two skip bins for holding material contents with at least one of the skip bins when in a storage condition on the vehicle being in a nested position with respect to another of the skip bins, and a removable bulk tipping bin with a capacity to contain material contents of a number of skip bins, the two arm members being operatively associated with said skip bins to support and move at least one skip bin at a time to or from a storage position in the storage area, and an emptying position above the bulk tipping bin.

2. The mobile skip bin handling vehicle, as claimed in claim 1, wherein said two arm members each include means separately convertible with a each of said skip bins for individually engaging, lifting, and rotating each of said skip bins automatically for movement thereof from a position of said skip bin off the vehicle to or from the emptying position above the bulk tipping bin and to or from a storage position in the storage area.

3. A mobile skip bin handling vehicle including at least two skip bins, comprising:

two hydraulically activated arm members, one operatively associated with each side of the vehicle, a drivers cabin at or toward the front of the vehicle, a storage area on the vehicle for storing said at least two skip bins with at least one of the skip bins being in a nested position with respect to another of the skip bins, the storage area being located between the drivers cabin and the removable bulk bin, a removable bulk tipping bin having a capacity to contain contents of a number of the skip bins, the two arm members also being operatively associated with said skip bins for supporting and moving at least one skip bin at a time to or from a storage position in the storage area, an emptying position above the bulk tipping bin, and a ground supporting position, and the bulk bin being located at or toward a rear of the vehicle.

4. The mobile skip bin handling vehicle as in claim 3, wherein each of the arm members comprise a first arm, a second arm and a third arm, said first arm having a first end which is pivotally secured to the vehicle and a second end which has pivotally secured thereto the second arm, and said third arm being pivotally secured to an end of the second arm, and a bracing extending between and holding together the second arm on one side of the vehicle to the second arm on the other side of the vehicle.

5. The vehicle as in claim 3, including a quadrilateral linkage for attaching the first arm on each side of the vehicle to the vehicle chassis and a hydraulic ram attached to a portion of the quadrilateral linkage to assist mechanical advantage through its full range of action of the ram with respect to the first arm.

6. The vehicle as in preceding claim 3, including means for removing the removable bulk tipping bin comprising slidable means to slide the removable bulk tipping bin to a position fully rearward of the chassis of the vehicle.

7. The vehicle as in preceding claim 3, wherein the removable bulk tipping bin is tippable by being inclined with a forward end of the bin being raised by the arm members.

8. The vehicle as in preceding claim 3, including attachment means for attaching the bulk tipping bin to the arm members and for controlling the position of the bulk tipping bin.

9. A mobile skip bin handling vehicle, including two hydraulically activated arm members, one of said arm members being on each side of the vehicle, and a quadrilateral linkage for attaching the arm members on each side of the vehicle to a vehicle chassis and a hydraulic ram attached to a portion of the quadrilateral linkage to assist mechanical advantage through its full range of action of the ram with respect to the first arm, a storage area on the vehicle for storing at least two skip bins with at least one of the skip bins being in a nested position with respect to another of the skip bins, a removable bulk tipping bin with a capacity to contain contents of a number of skip bins, the two arm members being operatively associated with said skip bins to support and move at least one skip bin at a time to or from a storage position in the storage area, and an emptying position above the bulk tipping bin.

10. The mobile skip bin handling vehicle as in claim 9, wherein each of the arm members comprises a first arm, a second arm and a third arm, said first arm having a first end which is pivotally secured to a chassis of the vehicle and a second end which has pivotally secured thereto the second arm, and said third arm being pivotally secured to an end of the second arm, and a bracing extending between and holding together the second arm on one side of the vehicle to the second arm on the other side of the vehicle.

11. The vehicle as in preceding claim 10, including attachment means for attaching the bulk tipping bin to the arm members and for controlling the position of the bulk tipping bin.

12. The vehicle as in preceding claim 9, means for removing the removable bulk tipping bin comprising slidable means to slide the removable bulk tipping bin to a position fully rearward of the chassis of the vehicle.

13. The vehicle as in preceding claim 9, wherein the removable bulk tipping bin is tippable by being inclined with a forward end of the bin being raised by the arm members.

14. The vehicle as in preceding claim 9, including attachment means for attaching the bulk tipping bin to the arm members and for controlling the position of the bulk tipping bin.

15. A mobile skip bin handling vehicle including two hydraulically activated arm members, one operatively associated with each side of the vehicle, and a quadrilateral linkage for attaching the arm members on each side of the vehicle to a vehicle chassis and a hydraulic ram attached to a portion of the quadrilateral linkage to assist mechanical advantage through its full range of action of the ram with respect to the first arm, a storage area on the vehicle for storing at least two skip bins with at least one of the skip bins being in a nested position with respect to another of the skip bins, a removable bulk tipping bin having a capacity to contain contents of a number of the skip bins, the two arm members also being operatively associated with said skip bins for supporting and moving at least one skip bin at a time to or from a storage position in the storage area, an emptying position above the bulk tipping bin, and a ground supporting position, a drivers cabin at or toward a front of the vehicle, the storage area on the vehicle being located between the drivers cabin and the removable bulk bin, and the bulk bin being located at or toward a rear of the vehicle.

* * * * *